June 2, 1959  J. C. HOLLIS  2,888,843
MACHINE TOOL TURRET WITH BI-DIRECTIONAL COUPLING
Filed Dec. 7, 1954  2 Sheets-Sheet 1

Inventor
John C. Hollis
by Carlson, Pitzner, Hubbard & Wolfe
Attorneys

Inventor
by John C. Hollis
Carlson, Pitzner, Hubbard & Wolfe
Attorneys

United States Patent Office 2,888,843
Patented June 2, 1959

2,888,843
MACHINE TOOL TURRET WITH BI-DIRECTIONAL COUPLING

John C. Hollis, Fond du Lac, Wis., assignor to Giddings & Lewis Machine Tool Company, Fond du Lac, Wis., a corporation of Wisconsin Application December 7, 1954, Serial No. 473,537

8 Claims. (Cl. 74—814)

The present invention relates in general to machine tools and in particular to machine tool turrets of the type which are adapted to mount a plurality of tools so as to be selectively indexed to a working station.

The general aim of the invention is to provide a new and improved machine tool turret of the foregoing type which can be rotated when and only when an indexing control handle is turned.

Concurrent with that aim, it is an object of the invention to provide such an indexable machine tool turret in which the turret head is locked against rotation, even when the main clamping means are released, by utilizing a novel drive connection between the control handle and the head which requires no affirmative locking or unlocking actuation on the part of a machine operator.

Another object is to provide such a turret which is relatively simple and compact in construction, affording the maximum degree of convenience for the machine operator with no danger of inadvertent damage to tools or workpieces.

Additionally, it is an object to provide an improved and simplified, yet highly reliable, bi-directional automatic coupling device finding advantageous use in the turret of the present invention but also having general utility in other applications. The term "bi-directional coupling" as used herein denotes a device having input and output members and in which rotational torque applied to the input member in either direction correspondingly drives the output member, but in which torque applied in either direction to the output member automatically causes coupling of the same to a third part. If the third part is rigidly mounted, the output member cannot rotate or drive the input member.

Other objects and advantages will become apparent as the following description proceeds, taken in conjunction with the accompanying drawings, in which.

Figure 5:
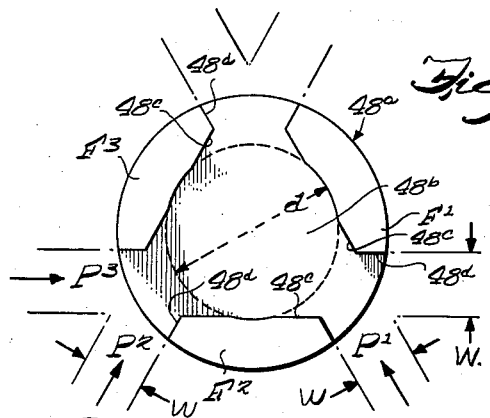
Figure 1:
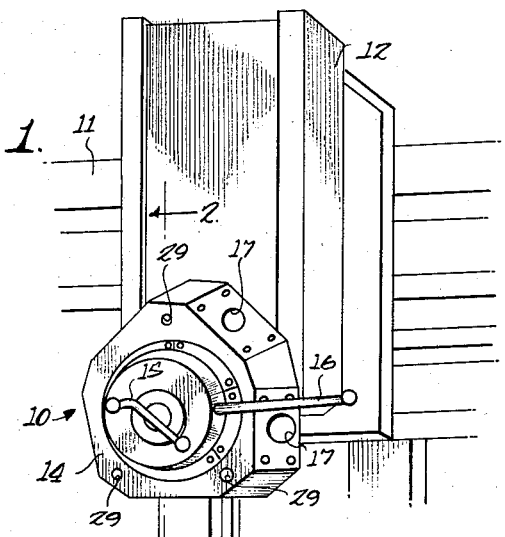
Figure 1 is a fragmentary perspective view of a part of a machine tool, here a vertical turret lathe, equipped with a tool turret embodying the features of the invention.
Figure 2:
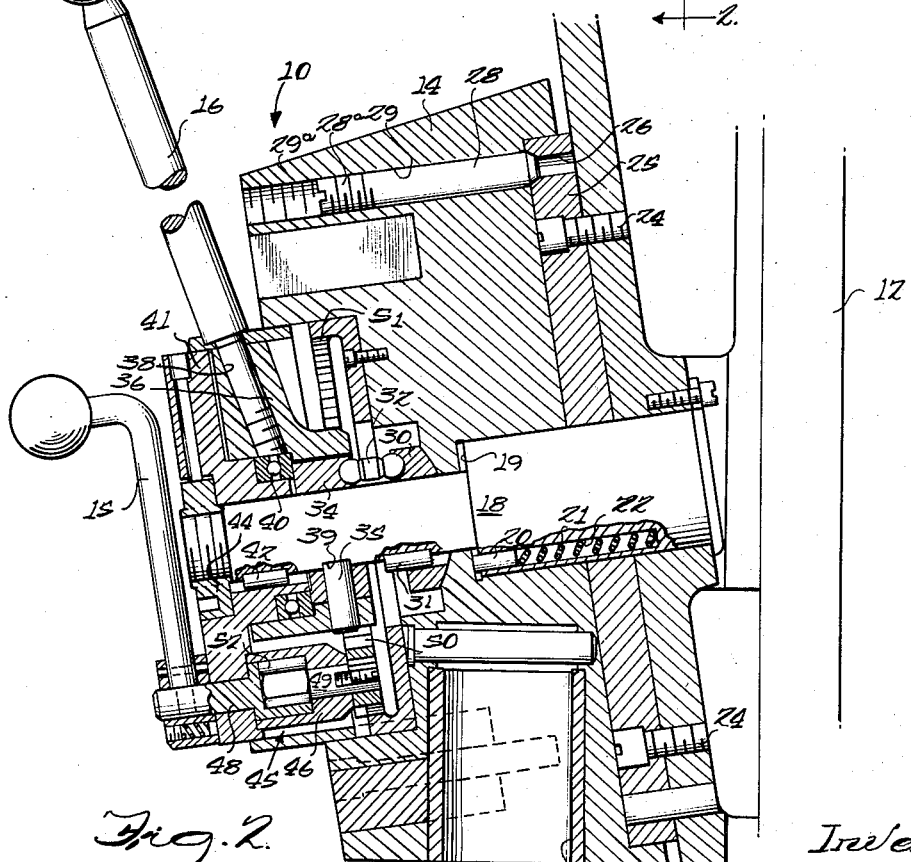
Fig. 2 is a vertical cross section of the turret taken substantially along the line 2—2 in Fig. 1.
Figure 3:
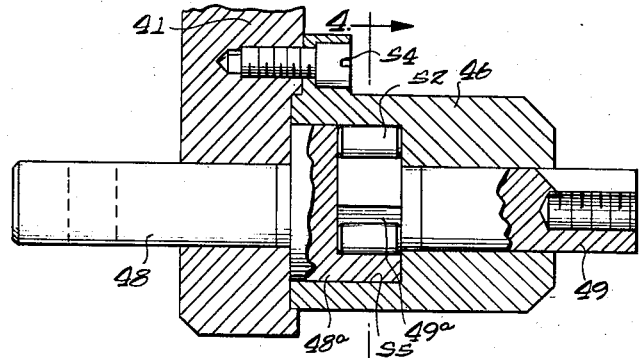
Figure 4:
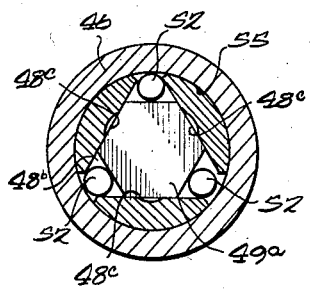
Figure 6:
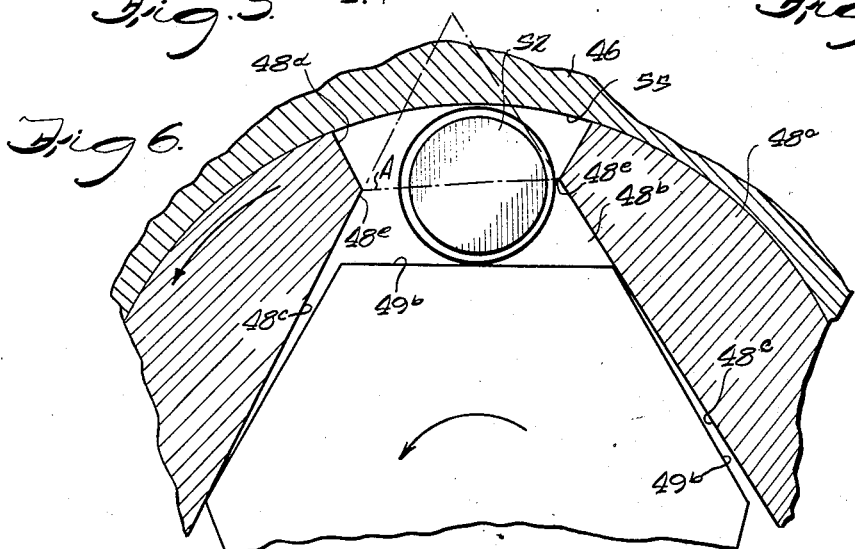
Figure 7:
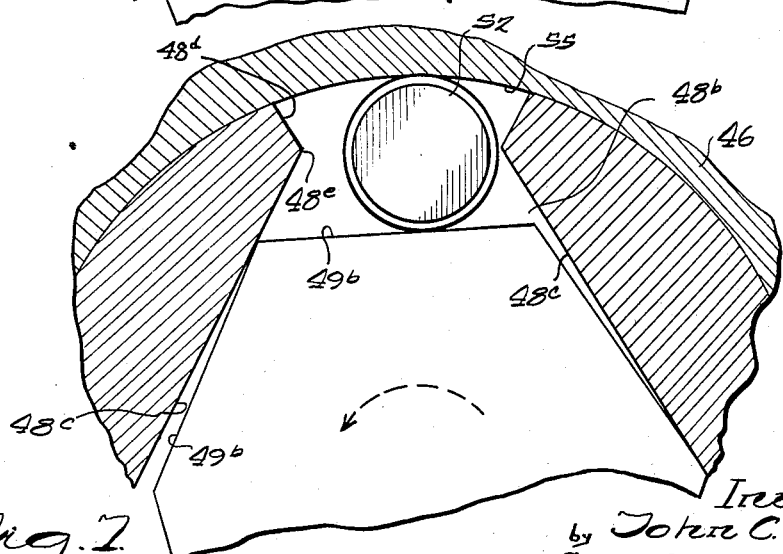

Figs. 3 and 4 are longitudinal and transverse cross sections, respectively, of the improved bi-directional coupling employed in the turret shown by Figs. 1 and 2, Fig. 4 being taken substantially along the line 4—4 in Fig. 3;

Fig. 5 is an end view of the driver head employed in the bi-directional coupling; and Figs. 6 and 7 are enlarged fragmentary detail views corresponding to a part of Fig. 4 and illustrating the operation of the bi-directional coupling during forward driving operation and attempted reverse drive conditions, respectively.

While the invention has been illustrated and described in some detail with reference to a particular embodiment, there is no intention that it thus be limited to such detail. On the contrary, it is intended here to cover all modifications, alternative constructions and equivalents falling within the spirit and scope of the invention as defined by the appended claims.

Referring now to the drawings, the invention has been illustrated as embodied in an indexable tool turret 10 (Figs. 1 and 2) for a machine tool, in this case a vertical turret lathe. Only the horizontal cross rail 11 and the vertical slide 12 of the lathe have been shown in Fig. 1, since the latter may take a variety of forms known to those skilled in the art.

In general, the turret 10 includes a multi-sided turret head 14 carried by the vertical slide 12 and is rotatably indexable about a stationary substantially horizontal axis. Each side of the turret head, in the present case five sides, is socketed as at 17 to receive tool holders (not shown) so that tools carried thereby may be successively brought into working relation with a rotating workpiece (not shown). For rotationally indexing the head 14, a control crank or handle 15 is located at the outer face of the turret and connected by drive means to be described with the turret head. The head may be rigidly locked at any one of its five index stations by actuation of a clamping lever 16.

With more specific reference to Fig. 2, it will be seen that the head 14 is journaled on a stationary stud 18 made fast at a slightly downwardly inclined angle to the slide 12. For affording the clamping action mentioned above, the stud 18 and head 14 are matingly stepped as at 19, the head having freedom for axial shifting on the stud and being biased outwardly by means of a plurality of pins 20 backed by compression springs 21 seated in bores 22 formed within the larger diameter portion of the stud. Mounted fast to the inclined portion of the slide 12 by means of a plurality of bolts 24 is a backing plate 25 which is formed with a plurality of circumferentially spaced countersunk holes 26, each of the holes corresponding to one of the turret head stations. In the present case, there are five holes 26 located around the edge of the backing plate 25. A plurality of index pins 28, tapered at their inner ends for mating engagement in the countersunk holes 26, extend through a corresponding plurality of axial holes 29 spaced around the head 14. For purposes of adjustment permitting accurate determination of the axial position of the head 14 when the indexing pins 28 are seated in the holes 26, and pins are formed with threaded heads 28a slotted to receive a screwdriver and cooperatively engaged in threaded, countersunk portions 29a of the holes 29. In the present case, five pins 28 are provided in the head 14, and successful and reliable locking is obtained by using five holes 26 circularly spaced in the plate 25, three of which are countersunk to cooperate with the pins and two of which are enlarged to allow clearance for the pins. In effect, therefore, only three of the pins 28 actively clamp the head at any one time.

In order to seat the pins 28 in the holes 26, and thus clamp the head 14 at any of its five stations, provision is made to shift the head inwardly on the stud 18 against the bias of the springs 21. As here shown, a ring 30 axially slidable on the smaller diameter portion of the stud 18 is locked against rotation relative to the latter by a key 31, the ring bearing against the head 14 and controlled in axial position by a plurality of cooperating toggle links 32. Preferably, three such toggle links are pivotally connected between the ring 30 and a sleeve 34 which is rotatable on but axially fixed to the stud 18. Surrounding the sleeve 34 and locked thereto by a pin 35 is a collar 36 which is drilled and tapped as at 38 to receive the threaded end of the radially projecting locking lever 16. The rotational movement of the collar 36 and the lever 16 are limited by means of an arcuate groove 39 formed in the stud 18 and receiving the inner end of the pin 35. The latter pin thus not only holds the sleeve 34 and collar 36 in fixed relation but also, by its engagement in the groove 39, limits their rotational freedom relative to the stud 18. This rotational freedom is sufficient to swing the toggle links 32 between angled and dead center positions in which the ring 30 is permitted to retreat under the influence of the springs 21 or is shifted inwardly to position the head 14 with the pins 28 in the holes 26.

Preferably, a thrust bearing 40 is seated in a recessed portion of a flange 41 to assure that the sleeve 34 and collar 36 may be easily rotated by the lever 16. The flange 41 is locked by a key 42 to the stud 18 and is retained axially by a splined ring 44 made fast to the outer end of the stud.

From the foregoing description it will be clear that actuation of the lever 16 causes reciprocatory movement of the head 14 along the stud 18 thereby permitting the insertion or retraction of the indexing pins 28 into or from the corresponding holes 26 whenever the head is in one of its five stations.

In accordance with the invention, provision is made for rotationally indexing the turret head 14 in either direction from station to station, or to any position intermediate the stations, whenever the index pins 28 are withdrawn from the holes 26, but in a manner such that the turret head, even when unbalanced, may rotate only when the control handle 15 is affirmatively moved by an operator. Such provision is made without employing any independent locking means requiring separate actuation or release by the operator. This greatly increases the convenience of control since the turret head is prevented from swinging or dropping under the influence of unbalanced weights, e.g., different tools carried thereby, whenever the indexing pins 28 are released. The operator need not take pains to hold the handle 15 against rotation when he releases the pins 28; there is no possibility of the turret swinging and thus causing one of the tools to strike the workpiece with possible damage to both. Moreover, rapid spinning of the handle 15 resulting from reverse drive due to the unbalanced weight of the turret is also precluded, thereby removing any danger of the operator's clothing becoming tangled with the handle or torn thereby.

In carrying out the invention, a bi-directional coupling device 45 is drivingly interposed between the handle 15 and the turret head 14, the driver element of the device being connected with the handle and the driven element of the device being connected with the head. As explained more fully below, the device 45 is operative to transmit motion and power from the handle 15 to the head 14, but to couple to a stationary part and prevent rotation of the head and consequent back-spinning of the handle 15 when the latter is not affirmatively moved.

In the illustrated embodiment, the bi-directional coupling 45 includes a housing 46 made fast to the inner surface of the flange 41, a driver element 48 which rotatably extends through the flange 41 to receive the handle 15, and a driven element 49 which carries a pinion 50 meshed with a cooperating ring gear 51 fixed to the turret head 14. A plurality of rollers 52 are interposed between the driver element 48, the housing 46, and the driven element 49 in a manner to provide the above described operation.

As shown in Fig. 2, the turret head 14 is formed with a central recess and the ring gear 51 is seated and fastened in the bottom of the recess. The parts 34 and 36 which do not rotate with the head 14, compactly nest into that recess, being protectively covered by the stationary flange 41. This leaves a protected space between the flange 41 and the ring gear 51, to receive the coupling device 45.

Considering the construction of the improved bi-directional device 45 in more detail with reference to Figs. 3, 4 and 5, it will be seen that the housing 46 is adapted for mounting on the flange 41 by means of a plurality of bolts 54, and is formed to define a hollow cylinder 55. Nested within the hollow cylinder 55 is a driver head 48a which is formed with an axial recess 48b having the cross-sectional shape of an equilateral polygon with its corners truncated. As shown best in Fig. 4, the recess 48b in this instance is triangular in shape being bounded by three converging sides 48c of equal length which form a triangle having its three corners truncated. The corners are truncated along the dashed line A as shown best in Fig. 5 by forming the driver head 48a with a corresponding plurality of passages 48d communicating from the recess 48b to the outer surface of the head. It will be seen, therefore, that each of the truncated corners of the triangular recess 48b leaves a pair of spaced prongs 48e defining the smallest dimension in the passage 48d which communicates from the interior of the driver head to the inner surface of the cylinder 55. The passages need not be flared outwardly in width from the prongs 48e, but this flaring lends to ease of machining as described below.

With reference to Fig. 5, it will be seen that the formation of the driver head recess 48b and passages 48d as described leaves the head 48a with three axially projecting fingers $f1$, $f2$, $f3$ which are mutually disposed at acute, here 60°, angles when viewed from the end. The fingers are foreshortened so that they do not meet, thereby leaving the interspaced passages 48d. The outer surfaces of the fingers may be arcuate for journaling contact with the walls of the cylindrical housing recess 55, although this is not necessary inasmuch as the shank portion of the driver element 48 may be otherwise journaled. The inner opposed surfaces 48c of the fingers $f1$, $f2$, $f3$ define the triangular recess 48b as described, although these surfaces need not be perfectly flat.

A characteristic of prior bi-directional coupling devices has been the complexity in shape and high cost of intricate machining required for some of the component parts. In the present instance, the driver head 48a is conveniently and economically formed by the simplest of machining operations. Such machining need include only, first, the drilling of a central axial hole in a solid head, the hole having a diameter $d$ as shown by dashed lines in Fig. 5, making it roughly tangential to the sides 48c of the desired triangular recess. As illustrated, this central hole is actually larger than necessary to make it tangential to the sides 48c, and these sides thus have central, arcuate depressions. As a second and last machining operation, three milling cuts with a tool of width $W$ are taken at 60° angles completely through the head along the paths P1, P2, P3. This at once forms the triangularly related surfaces 48c and the passages 48d, leaving the prongs 48e. The three fingers $f1$, $f2$, $f3$ are thus in exactly the shape desired.

For coacting with the driver head 48a, the driven element 49 is formed with a driven head 49a which is nested in the recess 48b of the driver head 48a with limited freedom for relative rotation. As here illustrated, the driven head 49a is cross-sectionally shaped as an equilateral polygon having twice the number of sides as the polygonal recess 48b. In the present case, therefore, the driven head 49a is formed in the shape of a hexagon and when nested in the recess 48b it presents three of its flat sides 49b opposite the passages 48d communicating with the surface 55 of the housing cylinder, the remaining three sides being opposite the three surfaces 48c defining the recess 48b. As illustrated best in Figs. 6 and 7, the hexagonal driven head 49a is made slightly undersize with respect to the recess 48b in the driver head 48a. This creates a limited angular freedom of rotation for the driven head 49a within the driver head 48a. For the hexagonal head 49a here illustrated it has been found that rotational freedom in the order of 6° provides very satisfactory performance. But once this freedom has been taken up as the driver element is turned, the driven head is positively rotated by abutment of its sides 49b against the mating surfaces 48c of the driver head (Fig. 6). Since the driven head is nested within the driver head, relatively high torques may be transmitted from the latter to the former without danger of deforming the parts.

In order to permit rotation of the driver element 48 within the housing 46 when input torque is applied to the former, but to prevent rotation of the driven element 49 within the housing when input torque is applied to it, the plurality of cylindrical rollers 52 are disposed within the respective passages 48d, and are thus interposed between the cylinder 55 and the driven head 49a. The rollers are given a diameter such that when they are centered on the supporting surfaces 49b a clearance exists between the rollers and the cylinder 55. That is, each roller 52 has a diameter which is less than the normal distance from the midpoint of the corresponding flat surface 49b to the inner curved surface 55 (Fig. 6). But each roller 52 has a diameter which is greater than the normal distance from a second point on the flat surface 49b displaced from said midpoint to the curved surface 55, such displacement being in a direction toward the narrower end of the space between the surfaces 49b and 55 (Fig. 7).

With this in mind, the operation of the bi-directional coupling device will become readily apparent. Fig. 6 illustrates the spatial relation of the several parts whenever counterclockwise torque is applied to the driver element 48. Since the latter is freely rotatable within the cylinder 55, it turns until its three surfaces 48c have abutting and driving engagement with the corresponding three sides 49b of the driven head 49a. It will be observed that the roller 52 always retreats to the trailing side of the passage 48d when the head 49a rotates in either direction. At this time, the right prong 48e contacts the roller 52 and holds the latter in the central region of the supporting surface 49b so that the roller may spin freely in having a reasonable degree of clearance between the driven head 49a and the cylinder 55. Thus, the driver head 48a turns freely and imparts output rotation to the driven head 49a, the rollers 52 slipping and rolling freely around the inner curved surface defining the hollow cylinder 55.

On the other hand, if input torque is applied to the driven element 49, the rollers 52 become wedged between the driven head 49a and the wall of the cylinder 55, thereby coupling both parts 48 and 49 to the housing 46. Fig. 7 illustrates the spatial relation of the components whenever a counterclockwise torque is applied to the driven element 49. The roller retreats to trailing side of the passage 48d, but in this case, the head 49a in moving through the angular freedom it has within the driver head 48a, shifts the roller 52 slightly away from the trailing prong 48e and cams the roller into firm engagement with the inner surface of the cylinder 55. Since the roller 52 is thus placed in compression, it positively prevents further rotation of the driven head 49a so that the latter cannot in turn drive the driver head 48a.

The foregoing action results regardless of the sense of torques applied to the driver element 48 or driven element 49. The former turns the latter in either direction when input torque is applied to the driver element 48; while the parts 48 and 49 are coupled and locked automatically to the housing 46 when input torque is applied to the driven element 49.

The size and spacing of the several coupling components is not especially critical although it has been found that, with a rotational freedom of 6° between the driver head 48a and driven head 49a, optimum performance is obtained by making the diameter of a circle inscribed in the hexagonal cross section of the driven head slightly less than three times the diameter of the several rollers 52. Specifically, best results have been achieved by making the diameter of an inscribed circle for the hexagonal head 49a 2.915 times the diameter of the several rollers 52. While it is conceivable that bi-directional coupling devices of the improved type here disclosed might be constructed with any number of the rollers 52, it has been found that the three roller arrangement illustrated, with a triangular recess 48b and a hexagonal driven head is the most desirable. The driver head 48a is easily machined, the hexagonal driven head 49a is of a standard shape which is easily milled, and the symmetrical, triangular location of the rollers results in equal distribution of locking loads when torque is applied to the output element 49. The triangular symmetry leaves the driven head 49a balanced and centered within the driver head so that accidental locking cannot occur when the input element 48 is rotated.

Considering now the operation of the turret 10 illustrated in Fig. 2, it will be apparent that whenever the handle 15 is rotated and input torque applied to the driver element 48, the driven element 49 will be correspondingly rotated so that the pinion 50 and ring gear 51 cause rotational indexing of the turret head 14. With the locking pins 28 released, the turret may be rotated in either direction to any desired position simply by turning the handle 15. On the other hand, if the different tools carried by the turret should cause it to be unbalanced, it will nevertheless remain stationary when the locking pins 28 are released. Input torque on the pinion 50 and driven element 49, due to the unbalanced weight, causes wedging of the roller 52 and a corresponding locking of the driven element 49 to the stationary housing 46.

Accordingly, the turret head 14 will remain stationary under all conditions except when the handle 15 is affirmatively rotated by an operator. The operator need not concern himself with holding the handle 15 as the pins 28 are released in order to prevent swinging movement of the head 14. The dangerous possibility of the turret dropping under the influence of unbalanced weights and permitting a tool to strike a workpiece with possible damage to each, is obviated. Furthermore, the handle 15 cannot spin rapidly as a result of the turret head dropping under unbalanced weights so that there is complete safety for the operator. It is possible for the operator to set the turret head to any rotational position intermediate the five index stations, for example, when he desires only to make some adjustment of a tool or tool holder. The turret may be rotated to a convenient position for making such adjustments and will be held there by the coupling device 45 even though the locking pins 28 are not engaged in the holes 26.

I claim:

1. In a machine tool turret, the combination comprising a stationary support, a stationary stud projecting from said support, a multi-faced tool-receiving turret head journaled for rotation on said stud and adapted to receive tools creating an unbalanced weight on the head, said head being formed with a central recess in its outer face, a ring gear fixed to said head and enclosed within said recess, means including a flange rigidly fixed to the outer end of said stud and substantially closing said recess, means including a clamping mechanism disposed within said recess for selectively locking said head to said support, and means for rotationally indexing said head when said locking means are released, said indexing means including a bi-directional coupling device disposed within said recess and located eccentrically relative to said stud, said device having a housing rigidly fixed to said flange, a driver element including a shaft portion journaled in and projecting through said flange, and a driven element having limited rotational freedom relative to said driver element, a crank handle fixed to said shaft portion, a pinion fixed to said driven element and meshed with said ring gear, and said coupling device further including means for releasing said two elements for rotation relative to said housing when input torque is applied to said handle but coupling said elements to said housing when torque is applied to said pinion from the turret head due to the unbalanced weight carried thereby.

2. In a machine tool turret, the combination comprising a stationary support, a stationary stud projecting from said support, a multi-faced tool-receiving turret head journaled for rotation on said stud and adapted to receive tools creating an unbalanced weight on the head, said head being formed with a central recess in its outer face, a ring gear fixed to said head in concentric relation to said stud and enclosed within said recess, means including a flange rigidly fixed to the outer end of said stud and substantially closing said recess, means for rotationally indexing said head including a bi-directional coupling device disposed within said recess and located eccentrically relative to said stud, said device having a housing rigidly fixed to said flange, a driver and a driven element nested within said housing and with limited freedom for rotation relative to one another, said driver element having a shaft portion journaled in and projecting through said flange, a crank fixed to said shaft portion, a pinion fixed to said driver element and meshed with said ring gear, and means in said coupling device for releasing said two elements for rotation relative to said housing when input torque is applied to said handle but for coupling said elements to said housing in response to torque applied to said ring gear from the turret head due to the unbalanced weight carried thereby.

3. For use in the indexing drive connection between a rotatable handle and a rotatable turret head of a machine tool, a bi-directional coupling comprising, in combination, a stationary housing defining a hollow cylinder having an inner curved surface, a driver element adapted for connection to the handle and having a cylindrical driver head disposed in said cylinder, said driver head being formed with an axial recess cross-sectionally shaped as an equilateral polygon with truncated corners and also being formed with passages extending from such corners through the driver head to leave spaced prongs, a driven element adapted for operative driving connection to the turret head and having driven a head nested in said driver head recess with freedom for limited relative rotation, said driven head having an equilateral polygonal shape in cross section with twice as many flat sides as the interior of said recess, and a plurality of rollers each disposed in one of said passages and interposed between one of said flat sides on said driven head and the curved inner surface of said cylinder, each of said rollers having a diameter which is less than the normal distance from the midpoint of the corresponding flat side to said curved surface but which is greater than the normal distance from a second point on the flat side to said curved surface, said second point being displaced from said midpoint in a direction toward the narrower end of the space between said flat side and said curved surface.

4. A bi-directional coupling comprising, in combination, a housing defining a hollow cylinder having an inner curved surface, a driver head rotatably disposed in said cylinder and formed with a recess cross-sectionally shaped as an equilateral triangle with its corners truncated and with passages extending from such truncated corners through the wall of the head to leave spaced prongs, a driven head nested in said recess and sized to have limited rotational freedom in the general order of 6° relative to said driving head, said driven head being equilaterally hexagonal in cross section and having six flat surfaces therearound, and three rollers each disposed in one of said passages and interposed between one of said flat surfaces and said curved surface, each said roller having a diameter which is less than the normal distance from the midpoint of the corresponding flat surface to said curved surface but which is greater than the normal distance from a second point on that flat surface to said curved surface, said second point being displaced from said midpoint in a direction toward the narrower end of the space between said flat and curved surfaces.

5. A bi-directional coupling comprising, in combination, a housing defining a hollow cylinder having a curved inner surface, a driver head rotatably disposed in said cylinder and formed with three axially projecting fingers having internal flat surfaces mutually disposed at 60° angles in a cross-sectional plane and defining a recess therebetween, said fingers being foreshortened to define three passages extending from such recess to the surface of the driver head, a hexagonal driven head having six flat surfaces around its periphery and nested in said recess and surrounded by said fingers, three of said six flat surfaces being opposite said internal finger surfaces and having clearance therefrom to create freedom for limited relative rotation between said driver and driven heads, three flat surfaces of said hexagonal driven head being registered with said three passages, and three rollers each disposed in one of said passages between a corresponding one of said flat surfaces and said curved surface, each said roller having a diameter which is less than the normal distance from the midpoint of the corresponding flat surface to said curved surface but which is greater than the normal distance from a second point on that flat surface to said curved surface, said second point being displaced from said midpoint in a direction toward the narrower end of the space between said flat and curved surfaces.

6. A bi-directional coupling comprising, in combination, a housing defining a hollow cylinder having an inner curved surface, a driver element rotatably disposed in said cylinder and formed with a recess cross-sectionally shaped as an equilateral polygon with truncated corners and with passages extending between such truncated corners and the walls of said cylinder, a driven element cross-sectionally shaped as an equilateral polygon nested within said recess said driven element having a plurality of flat surfaces around its periphery and being sized to have limited rotational freedom within said recess, and a plurality of rollers each disposed in a respective one of said passages and interposed between said one flat surface of said driven element and the inner curved surface of said cylinder with limited freedom to shift radially and circumferentially of the driven element, each of said rollers having a diameter which is less than the normal distance from the midpoint of the corresponding flat surface to said curved surface but which is greater than the normal distance from a second point on that flat surface to said curved surface, said second point being displaced from said midpoint in a direction toward the narrower end of the space between said flat and curved surfaces.

7. A bi-directional coupling comprising, in combination, a hollow cylindrical housing having a curved inner surface, a driver element having a generally cylindrical driver head rotationally nested within said housing, said driver head having an axial recess formed with two converging internal flat sides and a passage extending from said recess and between such sides to the external surface of the head, a driven element having a driven head nested totally within said recess and shaped to have two flat surfaces disposed with clearance opposite said two internal sides to create limited rotational freedom between said driver and driven heads, said driven head having a third flat surface registering with said passage, and a roller loosely disposed in said passage and loosely interposed between said flat surface and said curved surface, said roller having a diameter which is less than the normal distance from the midpoint of said flat surface to said curved surface but which is greater than the normal distance from a second point on said flat surface to said curved surface, said second point being displaced from said midpoint in a direction toward the narrower end of the space between said flat and curved surfaces.

8. A bi-directional coupling comprising, in combination, a hollow cylindrical housing having a curved inner surface, a driver head rotationally disposed in said housing and having a plurality of axially projecting fingers cross-sectionally disposed at acute angles and foreshortened to leave a passage extending therebetween to the external surface of the head, said fingers having opposed inner surfaces angularly disposed to one another, a driven head nested in said driver head and circumferentially surrounded by said fingers said driven head having flat surfaces disposed with clearance opposite said inner surfaces and having limited freedom for rotation relative to said fingers, said driven head having another flat surface registered with said passage in the driver head, and a roller loosely disposed in said passage and interposed between said flat surface and said curved surface, said roller having a diameter which is less than the normal distance from the midpoint of said flat surface to said curved surface but which is greater than the normal distance from a second point on said flat surface to said curved surface, said second point being displaced from said midpoint in a direction toward the narrower end of the space between said flat and curved surfaces.

References Cited in the file of this patent

UNITED STATES PATENTS

| | | |
|---|---|---|
| 1,140,479 | Potter | May 23, 1915 |
| 1,636,262 | Troendly | July 19, 1927 |
| 2,021,336 | Swartz | Nov. 19, 1935 |
| 2,260,119 | Marshall | Oct. 21, 1941 |
| 2,369,209 | Bullard | Feb. 13, 1945 |
| 2,493,272 | Spraragen | Jan. 3, 1950 |
| 2,559,960 | Houplain | July 10, 1951 |
| 2,703,847 | Kalikow | Mar. 8, 1955 |